UNITED STATES PATENT OFFICE.

GUSTAV KOLLER, OF FOREST GATE, ENGLAND.

ORGANIC-CHLORO-COMPOUND SOAPS AND CLEANSING COMPOSITIONS.

1,038,900.  Specification of Letters Patent.  Patented Sept. 17, 1912.

No Drawing.  Application filed June 22, 1911. Serial No. 634,702.

*To all whom it may concern:*

Be it known that I, GUSTAV KOLLER, residing at Forest Gate, in the county of Essex, England, have invented certain new and useful Improvements Relating to Organic-Chloro-Compound Soaps and Cleansing Compositions, of which the following is a specification.

This invention relates to the manufacture of soaps and saponaceous cleansing compositions containing organic chloro compounds and chiefly tetrachlorethane, pentachlorethane, dichlorethylene, trichlorethylene, and perchlorethylene in a permanently emulsified condition so that the said chloro compounds will not separate on the addition of water, but will give as required, clear or turbid solutions of a permanent nature and of highly germicide properties. The said chlorin derivatives and a number of similar chlorinated hydrocarbons are non-inflammable solvents of an anhydrous nature. Their incorporation into soaps and cleansing compositions is desirable on account of the remarkable dissolving properties they possess for greasy and tarry impurities, which where found in thick layers are but slowly and inefficiently removed from fabrics by ordinary soaps. They will also extract from raw or prepared fibers, wax, gums and rosins, which materials are not acted upon by ordinary soaps. Their incorporation into soaps is further desirable because they are excellent solvents for a large number of chemicals possessing valuable medical properties, such as sulfur, iodin, bromin and their derivatives, also of medical preparations which owing to their being more or less insoluble in water cannot be incorporated into soaps in the usual way, but which can be kept in solution or in suspension by soaps containing a suitable percentage of the said chloro compounds. Processes have been suggested which have for their object the incorporation into soaps of other anhydrous solvents such as benzin, petroleum spirit, naphtha, turpentine, heavy mineral oils, and similar materials. As the dissolving power of these is considerably inferior to that of the chloro compounds mentioned, the efficiency of the resulting soaps is limited. They also exhibit other drawbacks such as a dangerous degree of inflammability or an objectionable smell. Repeated efforts have also been made to find means to incorporate into soaps organic chlorin derivatives. Several such processes are known as for example solutions prepared with sulfonated fats or Turkey red oils, and also with the soap prepared by saponifying sulfonated fats. The process of rendering chlorinated hydrocarbons soluble in or miscible with water by the action of sulfonated oil has been previously proposed see for example British specifications No. 21280 of 1908 and No. 9441 of 1909. Other processes are based on the use of specially prepared oils or of certain oil mixtures to the exclusion of others, or on the use of specific saponifying materials to the exclusion of others. The resulting solutions or emulsions lather badly and are devoid of intrinsic disinfecting properties. The characteristic smell moreover of sulfonated or blown oils is imparted to the finished product rendering it unfit for all but industrial purposes.

This invention relates to the manufacture of similar, cheaper and in many respects better soaps and cleansing compositions containing chlorinated hydrocarbons and chiefly tetrachlorethane, pentachlorethane, dichlorethylene, trichlorethylene, and perchlorethylene in a permanently emulsified condition so that the said chloro compounds will not separate from the soap particles on the addition of water, but will give, as required, clear or turbid watery solutions of a permanent nature and of marked cleansing and germicide properties.

I have found that chlorinated hydrocarbons can be made permanently to combine with all kinds of soaps or soap making raw materials in the presence of such organic compounds made up of a hydrocarbon radical joined to a hydroxyl radical as are soluble at the same time in water and in the chlorinated hydrocarbons mentioned (as is the case for instance with alcohols and phenols). This process, therefore, is not based on the use of specific soap making raw materials to the exclusion of others except in so far as it is not proposed herein to employ sulfo-oleaginous bodies for rendering chlorinated hydrocarbons water soluble, nor to produce soaps or soap compositions made from or containing sulfo-oleaginous bodies as the use of such bodies not only increases the cost of the finished product but also diminishes or entirely destroys the lather producing properties of the soap or composition. Further it is not necessary to employ pure or practically pure caustic potash in the composition for although such material can be employed and is absolutely necessary for use in some of the prior soap compositions still by this invention employing the chlorinated derivatives of ethane and ethylene the much cheaper substances caustic soda or carbonate of soda or both and with or without caustic potash or carbonate of potash may be employed and these substances cannot be satisfactorily used with other chlorinated hydrocarbons such as carbon tetrachlorid. This invention is in fact based on the discovery I have made as the result of numerous experiments that the chlorinated derivatives of ethane and ethylene act in the presence of alkalis in an entirely different way from other known chlorinated hydrocarbons and yield highly concentrated soaps such as cannot be obtained with other chlorinated hydrocarbons except when oils containing sulfo-oleaginous products are used as a base.

While soaps and soap solutions, when heated with chlorinated hydrocarbons by themselves will not combine with them, they do so in the presence of phenols. Clear transparent products are obtained which will, when diluted with water, yield turbid emulsions of a permanent nature. In such emulsions the hydrocarbons will not separate, but will remain combined with the soap particles forming the said emulsions.

By the combined action of chlorinated hydrocarbons and alcohols on soaps and soap solutions new products are obtained which are soluble in water in all proportions and yield clear solutions. Similar results are obtained when chloro compounds are allowed to act in the presence of such organic compounds made up of a hydrocarbon radical joined to a hydroxyl radical as heretofore described on the raw materials during the process of saponification.

The addition of alcohol to soaps has been previously proposed for various purposes; for instance the alcoholic soap lye containing only a minute quantity of water has been recommended as an addition to benzene as an antielectrical agent for the purpose of preventing spontaneous ignition of benzene or other liquid hydrocarbons and is described in British specification No. 20818 of 1893. The addition of chlorinated hydrocarbons to inflammable solvents has been suggested as a means of rendering the latter non-inflammable, see for example British specification No. 21007 of 1909.

According to the present invention the addition of alcohols and of chlorinated hydrocarbons is not made for any of the purposes described above nor are the products manufactured in accordance with this invention intended or even capable of the application suggested in the said specifications but on the contrary the organic compounds as described are used in this process as a means of rendering soluble in water and miscible with it the chlorinated derivatives specified, the object being that of obtaining highly concentrated saponaceous cleansing or disinfecting compositions, which will dissolve in or mix with water in all proportions without precipitation or separation of the solvents incorporated.

The percentage of chlorin derivatives in the finished product can be made to vary as required and the selection of the chlorin derivatives, as well as the choice of the particular organic compound of the class described, entirely depends on the characteristics which it is desired to impart to the finished products, and it is possible to produce in the way described: (1) Concentrated soap essences for household purposes. (2) Hard, soft and liquid medicated soaps and hygienic cleansing compositions. (3) Hairwash and toilet preparations. (4) Textile soaps and dry cleaning soaps. (5) Germicide and vermicide compositions for horticultural, agricultural and veterinary use. (6) Lubricating soaps.

To obtain a soft chloro-compound soap which will yield with water well lathering turbid solutions of a permanent nature, I take for instance:—1 part of yellow household soap, 1 part of carbolic acid (of 33% strength) and 1 part of pentachlorethane (or any other of the organic chloro compounds mentioned). The ingredients are dissolved under application of heat.

When ethane compounds are used in the preparation of chlorinated hydrocarbon soaps from raw materials, the saponifiable raw material is first saponified in an alcoholic solution. The chlorinated hydrocarbon solvent should be added subsequently as otherwise the alkali will attack the ethane derivatives mentioned, and change them partly or completely into the corresponding ethylene derivatives. Thus tetrachlorethane would be transformed into trichlorethylene, and pentachlorethane into perchlorethylene. The ethylene compounds on the other hand are not acted upon by alkaline solutions. The chemical reaction just described would also take place when chlorinated ethane soaps are used in a warm bath containing a free alkali. This latter would be neutralized under formation of a corresponding quantity of an ethylene solvent. Chlorinated ethane soaps will therefore be of the greatest value in textile industries where free alkali, during the scouring processes, would injuriously affect the fiber or the fabrics under treatment. The presence of one of the said chlorinated ethane derivatives will therefore insure the absence of free alkali throughout the washing or scouring operations. At the same time the efficiency of the soaps is not impaired by the partial or complete transformation of one of the said chlorinated ethane derivatives into the corresponding ethylene derivatives, because both the ethane and ethylene derivatives mentioned are powerful solvents. Other chlorinated hydrocarbons such as for instance carbon tetrachlorid are also acted upon by caustic. But in this case the products of the reaction are not solvents and it is clear that when the solvent is destroyed the characteristic efficiency of the soap itself is destroyed. Owing to this fact and also to the higher boiling points of the majority of the solvents mentioned their incorporation offers distinct advantages over that of carbon tetrachlorid.

When preparing an organic chloro compound soap from raw materials, I take for instance:—1 part of a saponifiable raw material and dissolve it in 1 part of perchlorethylene (or any other suitable chloro-hydrocarbon or mixture of chloro-hydrocarbons) and after adding ½ part alcohol I saponify with sodium carbonate, sodium hydrate, potassium hydrate or any other saponifying materials or material and add to the finished product ½ part of cresol.

What I claim is:—

1. The manufacture of organic chloro compound soaps and cleansing compositions which consists in incorporating chlorinated hydrocarbon solvents of the ethane and ethylene series (preferably tetrachlorethane, pentachlorethane, dichlorethylene, trichlorethylene or perchlorethylene) into soaps and compositions of which soaps form an integral part other than soaps or soap compositions containing sulfo-oleaginous bodies, by means of organic compounds made up of a hydrocarbon radical joined to a hydroxyl radical which organic compounds are soluble both in water and in the chlorinated hydrocarbon.

2. The manufacture of soap and cleansing compositions which consists in adding to the known oils or mixtures of oils other than those containing sulfo-oleaginous products, chlorinated hydrocarbon solvents of the ethane and ethylene series, and such organic compounds, made up of a hydrocarbon radical joined to a hydroxyl radical, as are soluble in both the chlorinated hydrocarbons and in water, and saponifying the mixture with an appropriate compound of sodium.

3. The manufacture of soap and cleansing compositions which consists in adding to the known oils or mixtures of oils other than those containing sulfo-oleaginous products, chlorinated hydrocarbon solvents of the ethane and ethylene series, and such organic compounds, made up of a hydrocarbon radical joined to a hydroxyl radical, as are soluble in both the chlorinated hydrocarbons and in water, and saponifying the mixture with a sodium salt and a potassium salt mixed therewith.

4. An organic chloro-compound soap or cleansing composition composed of a sodium or sodium potassium soap or a composition of which sodium or sodium potassium soaps form an integral part, which soaps do not contain sulfo-oleaginous bodies and in which the percentage of water is so low that the amount of the fatty acid radical is more than 55% and a chlorinated hydrocarbon solvent of the ethane and ethylene series, and an organic compound made up of a hydrocarbon radical joined to a hydroxyl radical, which compound is soluble both in the chlorinated hydrocarbon and in water.

In witness whereof I have hereunto set my hand in the presence of two subscribing witnesses.

GUSTAV KOLLER.

Witnesses:
 G. B. STEPHENSON,
 H. WATSON.